United States Patent [19]

Bryant et al.

[11] Patent Number: 4,680,589

[45] Date of Patent: Jul. 14, 1987

[54] ADAPTIVE FAST FOURIER TRANSFORM WEIGHTING TECHNIQUE TO INCREASE SMALL TARGET SENSITIVITY

[75] Inventors: Stephen M. Bryant, Baltimore; Donald J. Speir, Columbia, both of Md.

[73] Assignee: The United States of America as represented by the Secretary of the Air Force, Washington, D.C.

[21] Appl. No.: 656,844

[22] Filed: Oct. 2, 1984

[51] Int. Cl.[4] ............................................... G01S 7/32
[52] U.S. Cl. .................................... 342/196; 342/159; 342/91
[58] Field of Search .............. 343/5 CE, 5 CF, 5 DP, 343/5 FT, 5 NQ, 7 A, 7.3, 7.7, 17.1 R, 17.2 R, 17.2 PC; 364/724, 726; 342/195, 196, 159–164

[56] References Cited

U.S. PATENT DOCUMENTS

| | | | |
|---|---|---|---|
| 3,249,940 | 5/1966 | Erickson | 343/17.1 R |
| 3,725,923 | 4/1973 | Bose et al. | 343/7.7 |
| 3,877,011 | 4/1975 | Holberg et al. | 343/7.7 |
| 3,992,616 | 11/1976 | Acker | 364/724 |
| 4,093,948 | 6/1978 | Long, III | 343/7 A |
| 4,117,538 | 9/1978 | Shrader et al. | 364/724 X |
| 4,132,990 | 1/1979 | DiDomizio et al. | 343/7 A |
| 4,156,875 | 5/1979 | Keane et al. | 343/7.3 |
| 4,377,811 | 3/1983 | Mooney et al. | 343/7 A |
| 4,379,295 | 4/1983 | Lewis et al. | 343/17.2 PC |
| 4,384,291 | 5/1983 | Lewis et al. | 343/17.2 PC |

FOREIGN PATENT DOCUMENTS 58-70182  4/1983  Japan ................................ 343/5 CE

OTHER PUBLICATIONS

"A CMOS/SOS Pipeline FFT Processor", L. Martinson et al; Naelon '77 Record, pp. 574–579.

Primary Examiner—Thomas H. Tarcza
Assistant Examiner—Bernarr Earl Gregory
Attorney, Agent, or Firm—William G. Auton; Donald J. Singer; James E. Maslow

[57] ABSTRACT

A radar signal processor which operates without clutter canceller and AGC circuits by applying an adaptive weighting circuit which adjusts the FFT weighting function on a range gate basis to account for clutter in that range gate. An input buffer determines $Log_2$ values per range gate for use in the weighting operation and a normalization circuit scales the weighted FFT output to facilitate post-processing.

14 Claims, 7 Drawing Figures

ADAPTIVE FAST FOURIER TRANSFORM WEIGHTING TECHNIQUE TO INCREASE SMALL TARGET SENSITIVITY

STATEMENT OF GOVERNMENT INTEREST

The invention described herein may be manufactured and used by or for the Government for governmental purposes without the payment of any royalty thereon.

BACKGROUND OF THE INVENTION

Certain known radar signal processors contain a clutter canceller and a digital, fast automatic gain control (AGC) in line prior to the fast Fourier transform (FFT) circuit. The clutter canceller is a very narrow band reject filter which eliminates the clutter return from the mainbeam of the radar. The fast AGC limits the signal amplitude in the clutter canceller bandpass so that an FFT of modest dynamic range (such as on the order of 42 dB, for example) may be utilized. Flight experience has demonstrated, however, that the clutter canceller transient response and the AGC action cause a performance loss in high clutter conditions.

The use of full dynamic range FFT processing in a radar signal processor is therefore desirable, as it allows the elimination of both the clutter canceller and the fast AGC. However, utilization of a full dynamic range FFT in the presence of peak clutter requires heavy time domain weighting such that the sidelobes are down greater than 100 dB. Furthermore, known techniques of heavy weighting can cause a loss in target detectability of up to 2 dB and a 50 percent loss in doppler resolution.

SUMMARY OF THE INVENTION

It is therefore an object of the present invention to provide an improved full dynamic range FFT radar signal processor.

It is another object of the present invention to provide a full dynamic range FFT radar signal processor which operates without a clutter canceller or AGC.

It is yet another object of the present invention to provide a full range FFT weighting function which is adjusted on a range gate basis to account for clutter in the range gate.

It is still a further object of the present invention to provide a more cost effective and hardware efficient radar signal processing arrangement as an improvement over current processing techniques.

The present invention comprises a novel means of adjusting the weighting function (used to control sidelobes) at the front end of FFT processing. Since the RMS mainbeam clutter which a radar system encounters varies greatly as a function of terrain (typically on the order of 30 dB) and also as a function of range gate (typically on the order of 10 dB, range gate to range gate), the radar sensitivity loss and doppler resolution loss caused by the FFT weighting function can be minimized if the weighting function is adjusted on a range gate basis to account for the clutter level in that range gate. This invention comprises an arrangement which adaptively adjusts the weighting function in response to clutter levels determined on a range gate basis. Hence, each range gate is treated independently, thus allowing the processing to be adaptively tailored to the signal levels present in each range gate. A normalization circuit then scales the FFT-processed weighted data for post-processing.

DESCRIPTION OF THE DRAWINGS

The invention will be more clearly understood by reference to the following detailed description of a preferred embodiment thereof in conjunction with the accompanying drawings, in which.

DESCRIPTION OF THE PREFERRED EMBODIMENT

Figure 1:
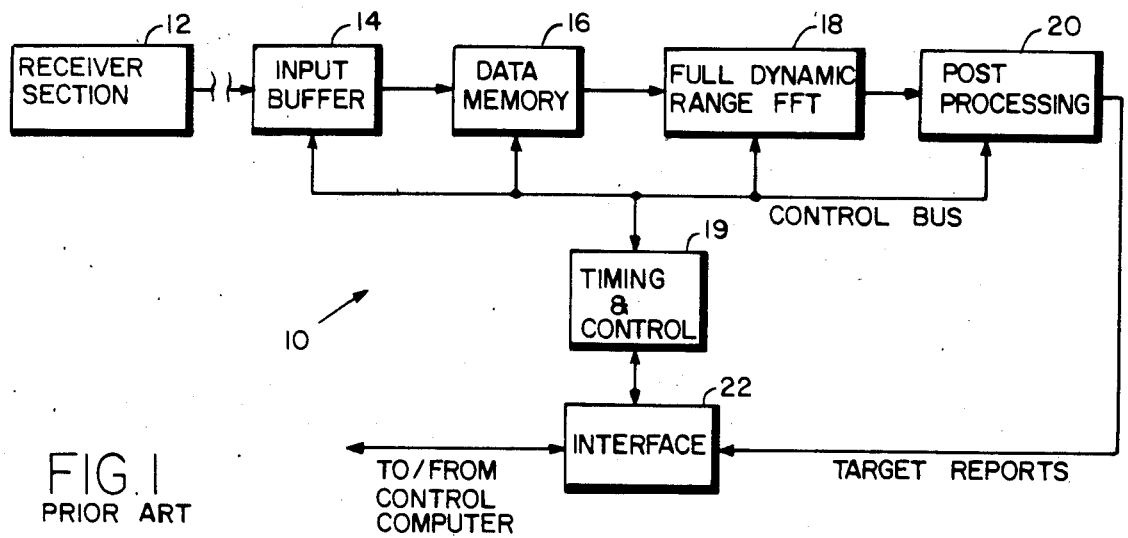
FIG. 1 is a block diagram of a typical prior art full dynamic range signal processor.

A prior art full dynamic range signal processor 10 is depicted in FIG. 1, where digitized receiver data is transferred from a receiver section 12 to a data memory 16 via input buffer 14. Once an entire coherent integration period of data has been accumulated in the data memory 16, the data is processed through pipelined FFT hardware 18. A weighting function, intended to reduce filter sidelobes, is typically applied in the first stage of the FFT section 18 of such prior art devices.

More particularly, the input buffer 14 serves to provide a digital interface between the A/D convertors in the receiver section 12 and the succeeding radar signal processor subsystems. Typically, data may be briefly stored in the input buffer in order to modify the inherent timing of the data stream. This operation, known as a "rate change" operation, ensures a compatible data interface between the receiver and signal processor subsystems, each of which may be operating at a different clock frequency. The data memory 16 may comprise a large semiconductor memory used to store data from the receiver until the signal processor is ready to process it. The full dynamic range FFT circuit 18 operates typically on an algorithm by which the doppler shift attributable to a target, and hence its relative velocity, is determined.

The post-processing block 20 of FIG. 1 represents a broad class of functions that generally comprise the target detection operation in the signal processor. For example, functions which are typically included here are detection of a target in the background of noise and clutter via an adaptive threshold algorithm (also known as a constant false alarm rate (CFAR) algorithm), determination of target unambiguious velocity and range, and determination of target elevation and azimuth.

The timing and control unit 19 represents that portion of the signal processor which generates basic clocking pulses for use in the processor, provides a point of storage for control commands from the control computer, and performs distribution of these control commands to the functional subunits of the signal processor at the correct time. In particular, timing and control unit 19 supplies range gate number data, range gate clocking data, interpulse period number data and write enable commands, as discussed below.

The control computer interface 22 represents a digital interface between the control computer and the radar signal processor. In the computer-to-signal processor direction of transfer, data on this bus represents primarily control parameters for the signal processor. In the signal processor-to-computer direction of transfer, data on this bus includes target detection data and built-in-test results from the signal processor.

The control computer contains the program that performs the overall mode control of the radar system. This computer must communicate with all the radar subunits (such as signal processor, transmitter, receiver, antenna, etc.) in order to ensure that the radar is synchronized and operating in the correct mode. The control computer is sometimes also responsible for monitoring the status of the radar via built-in-test indicators from each of the radar subunits. The control computer is also usually responsible for performing the target track function within the radar system.

The above arrangement comprises the baseline structure to which the present invention is adapted.

Figure 2:
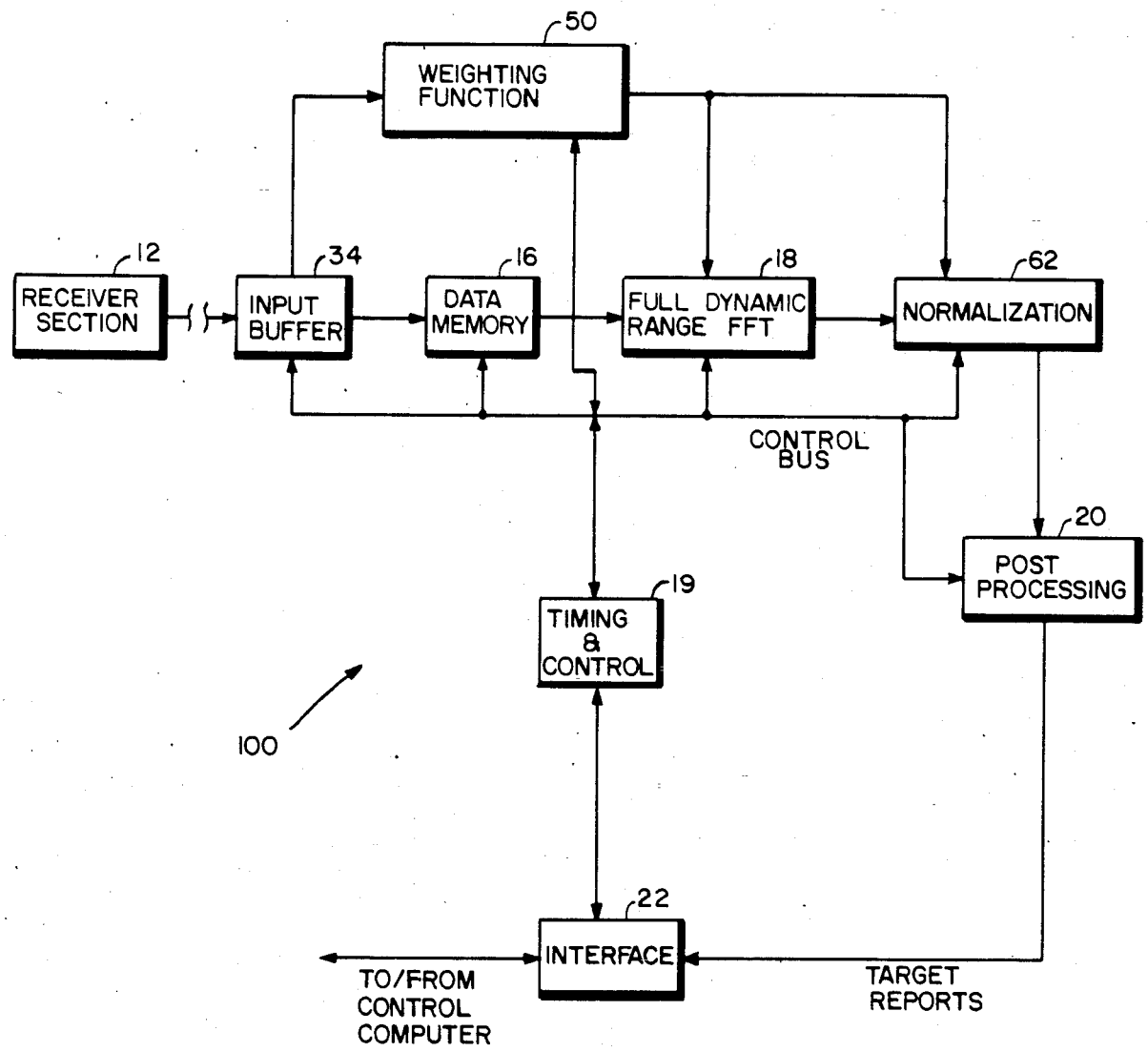
FIG. 2 is a block diagram of the improved system of the present invention.

The present invention is an improvement over the prior art configuration of FIG. 1 whereby full dynamic range FFT signal processing may now be accomplished without a clutter canceller or AGC, and in a manner where minimal loss to target detectability and doppler resolution is experienced. A block diagram of a preferred embodiment 100 is shown in FIG. 2, where the circuit 10 of FIG. 1 has been modified to incorporate the present improvements. Hence an input buffer 34, performing a maximum amplitude detection function described later, now couples the data from receiver section 12 to data memory 16 as well as determining and supplying to weighting function circuit 50 the $LOG_2$ of the maximum amplitude for each range gate. The output of weighting function block 50 is then coupled to the FFT circuit 18. The output of FFT circuit 18 is applied to normalization circuit 62, where amplitude differences in range gate data resulting from application of differing weighting functions to various range gates is normalized to enable various relative comparision functions of the post-processing subsystem. The timing and control function is again provided by timing control circuit 19, and interface with the control computer is again accomplished via interface circuit 22. Also, operation of data memory 16 and of post-processing circuit 20 remain as described earlier.

Figure 3:
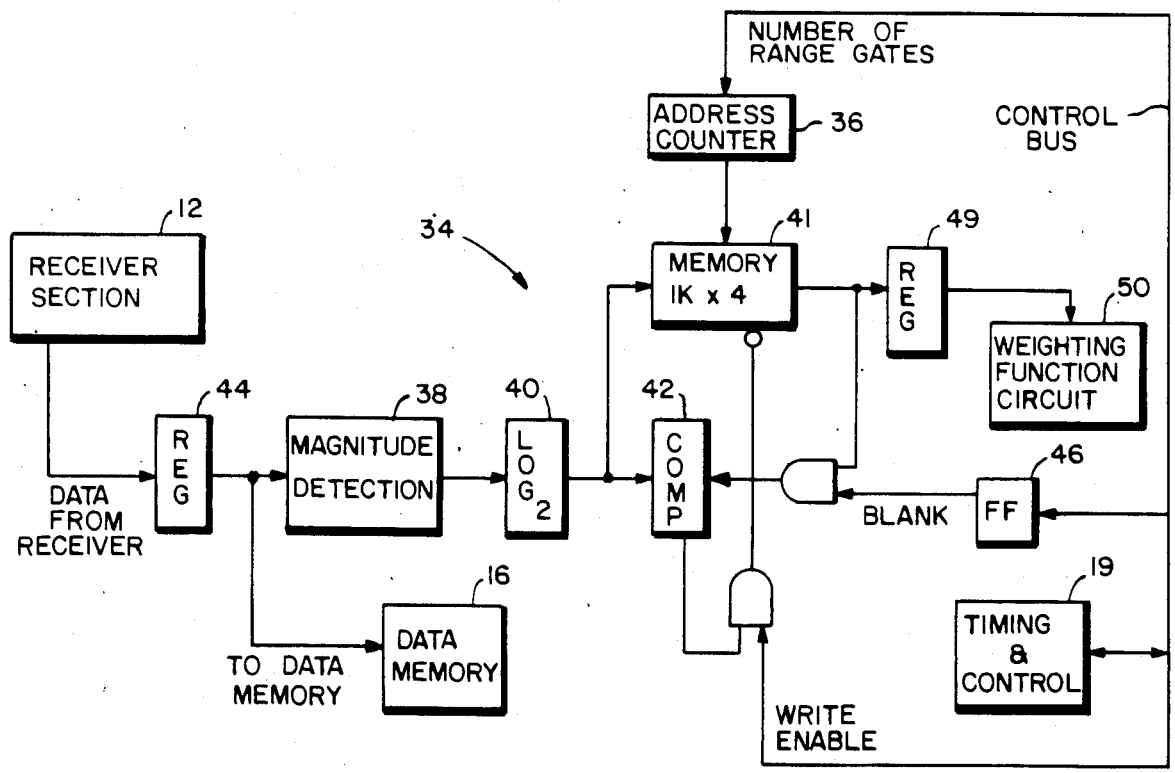
FIG. 3 is a block diagram of the maximum amplitude detect circuit of the present invention.

Turning now to FIG. 3, a maximum amplitude detection circuit is described in practice of the present invention. This circuit performs a necessary detection operation in anticipation of the weighting function of the invention. More particularly, in order to adaptively determine the appropriate weighting for each range gate, the maximum amplitude must be determined for each range gate across the entire data set. This maximum amplitude detection is accomplished in the input buffer circuit 34 shown in FIG. 3.

In the input buffer circuit diagram of FIG. 3, input register 44 couples the receiver section 12 to data memory 16 and to magnitude detection circuit 38. The register 44 serves to perform a one clock period temporary storage of receiver data to synchronize inputted data from receiver section 12 with internal signal processor timing supplied by timing and control circuit 19 before transferring the data to data memory 16.

Figure 4:
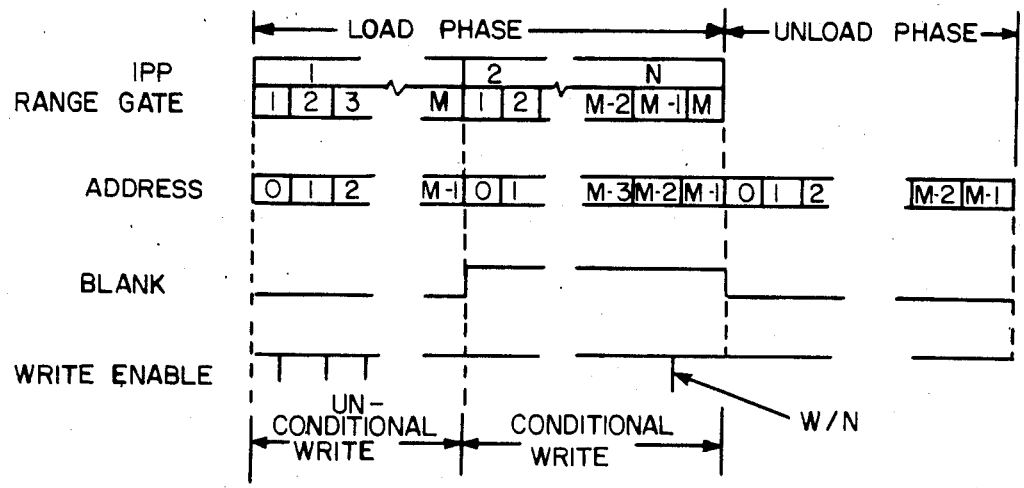
FIG. 4 is a timing diagram showing maximum range gate detect circuit timing.

The address counter 36 of buffer circuit 34 supplies a sequence of memory addresses to the 1K×4 memory 41. This address sequence is a simple, linearly increasing sequence that is modulo the number of range gates. A typical address sequence for M range gates is shown in FIG. 4.

The magnitude detection block 38 takes complex in-phase and quadrature signal data $[I+jQ]$ from the receiver, via register 44, and approximates the vector magnitude of the data calculated as the square root of $I^2$ plus $Q^2$. However, rather than computing squares and square roots, an approximation of $\max(I,Q) + \frac{1}{2} \min(I,Q)$ is employed.

The $Log_2$ circuit 40 simply computes the $Log_2$ of the vector magnitude data from detection block 38 and passes it on to 1K×4 memory 41 and comparator 42. For a 14 bit input signal magnitude, the $Log_2$ function will have the following values:

| LOG | MAGNITUDE |
|---|---|
| 0 | $0_8$–$1_8$ |
| 1 | $2_8$–$3_8$ |
| 2 | $4_8$–$7_8$ |
| 3 | $10_8$–$17_8$ |
| 4 | $20_8$–$37_8$ |
| 5 | $40_8$–$77_8$ |
| 6 | $100_8$–$177_8$ |
| 7 | $200_8$–$377_8$ |
| 8 | $400_8$–$777_8$ |
| 9 | $1000_8$–$1777_8$ |
| 10 | $2000_8$–$3777_8$ |
| 11 | $4000_8$–$7777_8$ |
| 12 | $10000_8$–$17777_8$ |
| 13 | $20000_8$–$37777_8$ |

The 1K×4 memory 41 shown in FIG. 3 is used to store the $Log_2$ of the interim maximum amplitude for each range gate. Meanwhile, comparator block 42 performs a comparison between the $Log_2$ values from block 40 representative of data in the magnitude detection block 38 and the $Log_2$ values stored in the 1K×4 memory 41. The comparator block 42 generates an output and permits a gated, conditional write enable of the memory 41 if the current $Log_2$ is greater than the $Log_2$ value that had been previously stored in memory 41. For example, as indicated in FIG. 4 by arrow "W/N", a write enable is supplied if range gate M-2 during interpulse period N (IPP-N) is greater than range gate M-2 during all other IPPs. As a result, the largest $Log_2$ value is written into memory 41. Thus after all data has been processed through the input buffer 34 for a coherent dwell time, the 1K×4 memory 41 contains the $Log_2$ of the largest amplitude that occurred for each range gate for that time period.

The "BLANK" signal in FIG. 3 is gated from flip-flop 46 to comparator 42 and is held at logic "0" during the first interpulse period (IPP-1) of a coherent dwell time so that the contents of the max−$Log_2$ memory 41 can be intialized. Since all values of $Log_2$ of the amplitudes of the first IPP will be greater than or equal to zero, this ensures that data for all range gates is written into this memory. After IPP-1, the comparison is made between the current $Log_2$ value and that stored in memory 41 to determine the largest value, as explained above.

Memory 41 is addressed modulo the number of range gates, a parameter supplied via address counter 36 from the central control computer for each integration period. For example, as the data for RG i is transferred from the receiver section 12, the memory 41 is addressed for RG i, and the maximum magnitude of that range gate up to the current IPP is read and compared with RG i data in the current IPP. If the $Log_2$ of the range gate amplitude in the current IPP is greater than the interim value stored in memory 41 for that range gate, the memory is updated with the value from the current IPP. As shown in the timing diagram of FIG. 4, this cycle (the LOAD PHASE) is repeated until the maximum magnitude has been determined for each range gate over all IPPs in the coherent integration time period.

The register 49 at the output of memory 41 is used for temporary storage of maximum $Log_2$ data for each range gate (after completion of a coherent dwell period) before the data is used in the selection of a weighting function. Thereafter this output is applied to register 51 at the input of the weighting function select hardware. A preferred embodiment of the weighting function select hardware 50 is shown in the block diagram of FIG. 5. More particularly, once the maximum magnitude for each range gate is determined in buffer circuit 34, the maximum log code values are transferred to a 1K×4 buffer memory 52 in the weighting function circuit 50 via register 51. These values are used to select a weighting function from weighting function PROM 56 for each range gate.

Memory 52 and the address counter 53 have the same function as described with respect to FIG. 3 (blocks 41 and 36, respectively). Furthermore, in an actual hardware implementation, the functions shown in FIG. 3 and in FIG. 5 might well be implemented in common hardware. For example, memory 52 could be implemented as one side of a double buffered version of the memory of the input buffer hardware, and thus not necessitate a data transfer between memories during the UNLOAD PHASE. Two separate memories are described herein to facilitate explanation of the circuit. In any event, the $Log_2$ value shown coming into register 51 here is actually the same data at output register 49, in FIG. 3, and represents the current $Log_2$ of the detected maximum amplitude for each range gate in the integration period. This data is written into memory 52 during the UNLOAD PHASE of the input buffer hardware 34, in the form of addresses to specific weighting functions in the weighting function PROM 56. This provides a mechanism to map the $Log_2$ values of range gate magnitudes to specific weighting functions. Once the $Log_2$ representation has been stored in memory 52, it is read out modulo the number of range gates for each IPP in the integration period.

Register 55 is coupled between the output of memory 52 and the input of mapping RAM 54. Register 55 is clocked on a range gate basis, so as to be able to provide temporary storage of the maximum $Log_2$ for each range gate. This $Log_2$ value is used as an address into the mapping RAM 54.

Mapping RAM 54 provides a means for modifying the weighting function select on an integration period basis. The address to RAM 54 is the maximum $Log_2$ value itself, thus providing the capability to address up to 16 locations of this memory. The contents of RAM 54 may be updated as often as each integration period by the control computer. These contents represent pointers, for each discrete $Log_2$ value, and point into the address space of the weighting function tables. The contents of the mapping RAM 54 are writable via instructions from the control computer.

The weighting function PROM 56 coupled to the output of mapping RAM 54 is preferably comprised of several fused-link programmable read only memories that contain several different weighting functions. The purpose of the weighting function is to control the level of sidelobes in the frequency domain during the FFT process. The signal level expected in an FFT filter dictates the level of weighting that must be used. For example, a filter in which heavy clutter is expected must be weighted much more heavily than a filter in the clear region. Weighting function PROM 56 is addressed with the output of the mapping RAM 54 (to select a particular weighting function as a function of range gate amplitude) and the current IPP number. The IPP number is supplied from timing and control unit 19 to PROM 56 to address the individual values of the selected weighting function.

Figure 6:
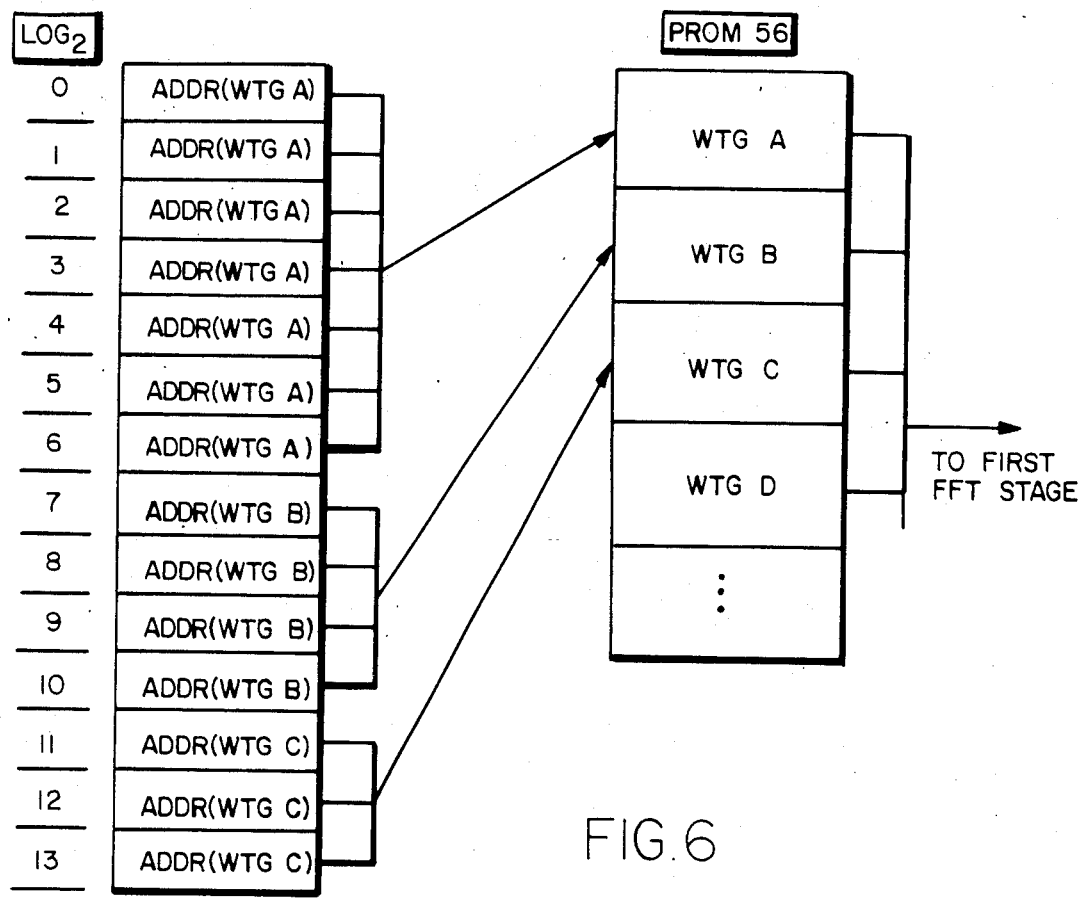
FIG. 6 is a sample application of the mapping RAM of the present invention.

FIG. 6 shows an exemplary application of the mapping RAM 54 in conjunction with weighting function PROM 56. In the example provided in FIG. 6, four different weighting functions are shown, labelled "WTG A"–"WTG D". These are all Dolph-Chebyshev type of weighting, but each produce different sidelobe levels in their frequency domain. Preferably, the weighting functions in the example take the form of 40 dB, 55 dB, 70 dB, and 90 dB Dolph-Chebyshev weighting, respectively. Of course this is only one possible situation. If, for example, only one weighting function were desired independent of maximum range gate amplitude, the sixteen locations of the mapping RAM could be loaded with a single value pointing to the desired weighting function in the weighting function PROM address space.

The purpose of the mapping RAM 54 is to provide a mechanism to associate a particular weighting function with a level or set of levels of maximum range gate amplitudes, where maximum range gate amplitudes are represented by the maximum $Log_2$ of the range gate amplitudes. TABLE A represents one example of the possible contents of the mapping RAM 54. Shown in TABLE A are addresses 0 to 127 of the mapping RAM (decimal numbers) and the binary contents (eleven bits) for each address. Only the first 14 addresses are used because the value of $Log_2$ of the range gate amplitudes is in the range of 0 to 13. The binary contents of each of these addresses is used as a start address into the weighting function PROM 56. Therefore, the mapping represented in this example appears as shown below (converting binary representation of mapping RAM contents to octal):

TABLE A

| Example Contents of Mapping Ram | | | | | | | |
|---|---|---|---|---|---|---|---|
| 0 | 00000000000 | 32 | 00000000000 | 64 | 00000000000 | 96 | 00000000000 |
| 1 | 00000000000 | 33 | 00000000000 | 65 | 00000000000 | 97 | 00000000000 |
| 2 | 00000000000 | 34 | 00000000000 | 66 | 00000000000 | 98 | 00000000000 |
| 3 | 00000000000 | 35 | 00000000000 | 67 | 00000000000 | 99 | 00000000000 |
| 4 | 00000000000 | 36 | 00000000000 | 68 | 00000000000 | 100 | 00000000000 |
| 5 | 00000000000 | 37 | 00000000000 | 69 | 00000000000 | 101 | 00000000000 |
| 6 | 00000000000 | 38 | 00000000000 | 70 | 00000000000 | 102 | 00000000000 |
| 7 | 00010000000 | 39 | 00000000000 | 71 | 00000000000 | 103 | 00000000000 |
| 8 | 00010000000 | 40 | 00000000000 | 72 | 00000000000 | 104 | 00000000000 |

TABLE A-continued
Example Contents of Mapping Ram

| | | | | | | | |
|---|---|---|---|---|---|---|---|
| 9 | 00010000000 | 41 | 00000000000 | 73 | 00000000000 | 105 | 00000000000 |
| 10 | 00010000000 | 42 | 00000000000 | 74 | 00000000000 | 106 | 00000000000 |
| 11 | 00100000000 | 43 | 00000000000 | 75 | 00000000000 | 107 | 00000000000 |
| 12 | 00100000000 | 44 | 00000000000 | 76 | 00000000000 | 108 | 00000000000 |
| 13 | 00100000000 | 45 | 00000000000 | 77 | 00000000000 | 109 | 00000000000 |
| 14 | 00000000000 | 46 | 00000000000 | 78 | 00000000000 | 110 | 00000000000 |
| 15 | 00000000000 | 47 | 00000000000 | 79 | 00000000000 | 111 | 00000000000 |
| 16 | 00000000000 | 48 | 00000000000 | 80 | 00000000000 | 112 | 00000000000 |
| 17 | 00000000000 | 49 | 00000000000 | 81 | 00000000000 | 113 | 00000000000 |
| 18 | 00000000000 | 50 | 00000000000 | 82 | 00000000000 | 114 | 00000000000 |
| 19 | 00000000000 | 51 | 00000000000 | 83 | 00000000000 | 115 | 00000000000 |
| 20 | 00000000000 | 52 | 00000000000 | 84 | 00000000000 | 116 | 00000000000 |
| 21 | 00000000000 | 53 | 00000000000 | 85 | 00000000000 | 117 | 00000000000 |
| 22 | 00000000000 | 54 | 00000000000 | 86 | 00000000000 | 118 | 00000000000 |
| 23 | 00000000000 | 55 | 00000000000 | 87 | 00000000000 | 119 | 00000000000 |
| 24 | 00000000000 | 56 | 00000000000 | 88 | 00000000000 | 120 | 00000000000 |
| 25 | 00000000000 | 57 | 00000000000 | 89 | 00000000000 | 121 | 00000000000 |
| 26 | 00000000000 | 58 | 00000000000 | 90 | 00000000000 | 122 | 00000000000 |
| 27 | 00000000000 | 59 | 00000000000 | 91 | 00000000000 | 123 | 00000000000 |
| 28 | 00000000000 | 60 | 00000000000 | 92 | 00000000000 | 124 | 00000000000 |
| 29 | 00000000000 | 61 | 00000000000 | 93 | 00000000000 | 125 | 00000000000 |
| 30 | 00000000000 | 62 | 00000000000 | 94 | 00000000000 | 126 | 00000000000 |
| 31 | 00000000000 | 63 | 00000000000 | 95 | 00000000000 | 127 | 00000000000 |

TABLE B
Example Contents of Weighting Function PROM
Address 0-127
40 dB Dolph-Chebyshev Weighting

| | | | | | | | |
|---|---|---|---|---|---|---|---|
| 0 | 0011010110000 | 32 | 0100110110101 | 64 | 1000000000000 | 96 | 0100101100010 |
| 1 | 0000101111010 | 33 | 0101000001000 | 65 | 0111111111100 | 97 | 0100100001111 |
| 2 | 0000110100011 | 34 | 0101001011001 | 66 | 0111111110100 | 98 | 0100010111100 |
| 3 | 0000111001101 | 35 | 0101010101010 | 67 | 0111111101000 | 99 | 0100001101001 |
| 4 | 0000111111011 | 36 | 0101011111011 | 68 | 0111111011000 | 100 | 0100000010111 |
| 5 | 0001000101010 | 37 | 0101101001010 | 69 | 0111111000101 | 101 | 0011111000100 |
| 6 | 0001001011100 | 38 | 0101110011000 | 70 | 0111110101101 | 102 | 0011101110010 |
| 7 | 0001010001111 | 39 | 0101111100100 | 71 | 0111110010010 | 103 | 0011100100001 |
| 8 | 0001011000101 | 40 | 0110000101111 | 72 | 0111101110011 | 104 | 0011011010001 |
| 9 | 0001011111101 | 41 | 0110001111000 | 73 | 0111101010001 | 105 | 0011010000001 |
| 10 | 0001100111000 | 42 | 0110011000000 | 74 | 0111100101011 | 106 | 0011000110011 |
| 11 | 0001101110100 | 43 | 0110100000101 | 75 | 0111100000010 | 107 | 0010111100101 |
| 12 | 0001110110010 | 44 | 0110101001000 | 76 | 0111011010101 | 108 | 0010110011001 |
| 13 | 0001111110010 | 45 | 0110110001001 | 77 | 0111010100101 | 109 | 0010101001111 |
| 14 | 0010000110101 | 46 | 0110111000111 | 78 | 0111001110010 | 110 | 0010100000110 |
| 15 | 0010001111001 | 47 | 0111000000011 | 79 | 0111000111100 | 111 | 0010010111110 |
| 16 | 0010010111110 | 48 | 0111000111100 | 80 | 0111000000011 | 112 | 0010001111000 |
| 17 | 0010100000110 | 49 | 0111001110010 | 81 | 0110111000111 | 113 | 0010000110100 |
| 18 | 0010101001111 | 50 | 0111010100101 | 82 | 0110110001001 | 114 | 0001111110010 |
| 19 | 0010110011001 | 51 | 0111011010101 | 83 | 0110101001000 | 115 | 0001110110010 |
| 20 | 0010111100101 | 52 | 0111100000010 | 84 | 0110100000101 | 116 | 0001101110100 |
| 21 | 0011000110011 | 53 | 0111100101011 | 85 | 0110011000000 | 117 | 0001100110111 |
| 22 | 0011010000001 | 54 | 0111101010001 | 86 | 0110001111000 | 118 | 0001011111101 |
| 23 | 0011011010001 | 55 | 0111101110100 | 87 | 0110000101111 | 119 | 0001011000101 |
| 24 | 0011100100001 | 56 | 0111110010010 | 88 | 0101111100100 | 120 | 0001010001111 |
| 25 | 0011101110010 | 57 | 0111110101101 | 89 | 0101110011000 | 121 | 0001001011100 |
| 26 | 0011111000100 | 58 | 0111111000101 | 90 | 0101101001010 | 122 | 0001000101010 |
| 27 | 0100000010111 | 59 | 0111111011000 | 91 | 0101011111011 | 123 | 0000111111011 |
| 28 | 0100001101001 | 60 | 0111111101000 | 92 | 0101010101010 | 124 | 0000111001101 |
| 29 | 0100010111100 | 61 | 0111111110100 | 93 | 0101001011001 | 125 | 0000110100010 |
| 30 | 0100100001111 | 62 | 0111111111100 | 94 | 0101000001000 | 126 | 0000101111010 |
| 31 | 0100101100010 | 63 | 1000000000000 | 95 | 0100110110101 | 127 | 0011010110000 |

TABLE C
Example Contents of Weighting Function PROM
Addresses 128-255
55 dB Dolph-Chebyshev Weighting

| | | | | | | | |
|---|---|---|---|---|---|---|---|
| 128 | 0000100011001 | 160 | 0011111000101 | 192 | 1000000000000 | 224 | 0011101100101 |
| 129 | 0000001101101 | 161 | 0100000100110 | 193 | 0111111111010 | 225 | 0011100000111 |
| 130 | 0000010000010 | 162 | 0100010000111 | 194 | 0111111101111 | 226 | 0011010101001 |
| 131 | 0000010011001 | 163 | 0100011101001 | 195 | 0111111011110 | 227 | 0011001001110 |
| 132 | 0000010110010 | 164 | 0100101001011 | 196 | 0111111000111 | 228 | 0010111110100 |
| 133 | 0000011001101 | 165 | 0100110101100 | 197 | 0111110101011 | 229 | 0010110011100 |
| 134 | 0000011101100 | 166 | 0101000001110 | 198 | 0111110001010 | 230 | 0010101000110 |
| 135 | 0000100001100 | 167 | 0101001101110 | 199 | 0111101100011 | 231 | 0010011110010 |
| 136 | 0000100110000 | 168 | 0101011001110 | 200 | 0111100111000 | 232 | 0010010100001 |
| 137 | 0000101010110 | 169 | 0101100101100 | 201 | 0111100000111 | 233 | 0010001010010 |
| 138 | 0000101111111 | 170 | 0101110001001 | 202 | 0111011010010 | 234 | 0010000000110 |

TABLE C-continued

Example Contents of Weighting Function PROM
Addresses 128–255
55 dB Dolph-Chebyshev Weighting

| | | | | | | | |
|---|---|---|---|---|---|---|---|
| 139 | 0000110101011 | 171 | 0101111100100 | 203 | 0111010011000 | 235 | 0001110111100 |
| 140 | 0000111011010 | 172 | 0110000111101 | 204 | 0111001011001 | 236 | 0001101110101 |
| 141 | 0001000001100 | 173 | 0110010010100 | 205 | 0111000010111 | 237 | 0001100110010 |
| 142 | 0001001000000 | 174 | 0110011100111 | 206 | 0110111010000 | 238 | 0001011110001 |
| 143 | 0001001111000 | 175 | 0110100111000 | 207 | 0110110000110 | 239 | 0001010110011 |
| 144 | 0001010110011 | 176 | 0110110000110 | 208 | 0110100111000 | 240 | 0001001111000 |
| 145 | 0001011110001 | 177 | 0110111010000 | 209 | 0110011100111 | 241 | 0001001000000 |
| 146 | 0001100110010 | 178 | 0111000010111 | 210 | 0110010010100 | 242 | 0001000001100 |
| 147 | 0001101110101 | 179 | 0111001011001 | 211 | 0110000111101 | 243 | 0000111011010 |
| 148 | 0001110111100 | 180 | 0111010011000 | 212 | 0101111100100 | 244 | 0000110101011 |
| 149 | 0010000000110 | 181 | 0111011010010 | 213 | 0101110001001 | 245 | 0000101111111 |
| 150 | 0010001010010 | 182 | 0111100000111 | 214 | 0101101001010 | 246 | 0000101001010 |
| 151 | 0010010100001 | 183 | 0111100111000 | 215 | 0101011001110 | 247 | 0000100110000 |
| 152 | 0010011110010 | 184 | 0111101100011 | 216 | 0101001101110 | 248 | 0000100001100 |
| 153 | 0010101000110 | 185 | 0111110001010 | 217 | 0101000001110 | 249 | 0000011101011 |
| 154 | 0010110011100 | 186 | 0111110101011 | 218 | 0100110101100 | 250 | 0000011001101 |
| 155 | 0010111110100 | 187 | 0111111000111 | 219 | 0100101001011 | 251 | 0000010110010 |
| 156 | 0011001001110 | 188 | 0111111011110 | 220 | 0100011101001 | 252 | 0000010011000 |
| 157 | 0011010101001 | 189 | 0111111101111 | 221 | 0100010000111 | 253 | 0000010000010 |
| 158 | 0011100000111 | 190 | 0111111111010 | 222 | 0100000100110 | 254 | 0000001101101 |
| 159 | 0011101100101 | 191 | 1000000000000 | 223 | 0011111100101 | 255 | 0000100011001 |

TABLE D

Example Contents of Weighting Function PROM
Addresses 256–383
70 dB Dolph-Chebyshev Weighting

| | | | | | | | |
|---|---|---|---|---|---|---|---|
| 256 | 0000000110001 | 288 | 0011000110101 | 320 | 1000000000000 | 352 | 0010111010001 |
| 257 | 0000000011101 | 289 | 0011010011100 | 321 | 0111111111000 | 353 | 0010101110000 |
| 258 | 0000000100110 | 290 | 0011100000100 | 322 | 0111111101001 | 354 | 0010100010010 |
| 259 | 0000000110000 | 291 | 0011101101111 | 323 | 0111111010011 | 355 | 0010010110110 |
| 260 | 0000000111100 | 292 | 0011111011010 | 324 | 0111110110110 | 356 | 0010001011110 |
| 261 | 0000001001010 | 293 | 0100001001000 | 325 | 0111110010010 | 357 | 0010000001010 |
| 262 | 0000001011010 | 294 | 0100010110101 | 326 | 0111101100111 | 358 | 0001110111000 |
| 263 | 0000001101100 | 295 | 0100100100100 | 327 | 0111100110101 | 359 | 0001101101011 |
| 264 | 0000010000000 | 296 | 0100110010010 | 328 | 0111011111101 | 360 | 0001100100001 |
| 265 | 0000010010110 | 297 | 0101000000001 | 329 | 0111010111110 | 361 | 0001101011011 |
| 266 | 0000010110000 | 298 | 0101001101110 | 330 | 0111001111010 | 362 | 0001010011001 |
| 267 | 0000011001100 | 299 | 0101011011010 | 331 | 0111000110000 | 363 | 0001001011011 |
| 268 | 0000011101011 | 300 | 0101101000101 | 332 | 0110111100001 | 364 | 0001000100000 |
| 269 | 0000100001101 | 301 | 0101110101110 | 333 | 0110110001101 | 365 | 0000111101011 |
| 270 | 0000100110010 | 302 | 0110000010100 | 334 | 0110100110101 | 366 | 0000110110110 |
| 271 | 0000101011010 | 303 | 0110001111000 | 335 | 0110011011000 | 367 | 0000110000110 |
| 272 | 0000110000110 | 304 | 0110011011000 | 336 | 0110001111000 | 368 | 0000101011010 |
| 273 | 0000110110110 | 305 | 0110100110101 | 337 | 0110000010100 | 369 | 0000100110010 |
| 274 | 0000111101001 | 306 | 0110110001101 | 338 | 0101110101110 | 370 | 0000100001101 |
| 275 | 0001000100000 | 307 | 0110111100001 | 339 | 0101101000101 | 371 | 0000011101011 |
| 276 | 0001001011011 | 308 | 0111000110000 | 340 | 0101011011010 | 372 | 0000011001100 |
| 277 | 0001010011001 | 309 | 0111001111010 | 341 | 0101001101110 | 373 | 0000010110000 |
| 278 | 0001011011011 | 310 | 0111010111110 | 342 | 0101000000001 | 374 | 0000010010110 |
| 279 | 0001100100001 | 311 | 0111011111101 | 343 | 0100110010010 | 375 | 0000010000000 |
| 280 | 0001101101011 | 312 | 0111100110101 | 344 | 0100100100100 | 376 | 0000001101100 |
| 281 | 0001110111000 | 313 | 0111101100111 | 345 | 0100010110101 | 377 | 0000001011010 |
| 282 | 0010000001010 | 314 | 0111110010010 | 346 | 0100001001000 | 378 | 0000001001010 |
| 283 | 0010001011110 | 315 | 0111110110110 | 347 | 0011111011010 | 379 | 0000000111100 |
| 284 | 0010010110110 | 316 | 0111111010011 | 348 | 0011101101110 | 380 | 0000000110000 |
| 285 | 0010100010010 | 317 | 0111111101001 | 349 | 0011100000100 | 381 | 0000000100110 |
| 286 | 0010101110000 | 318 | 0111111111000 | 350 | 0011010011100 | 382 | 0000000011101 |
| 287 | 0010111010001 | 319 | 1000000000000 | 351 | 0011000110101 | 383 | 0000000110001 |

TABLE E

Example Contents of Weighting Function PROM
Addresses 384–511
90 dB Dolph-Chebyshev Weighting

| | | | | | | | |
|---|---|---|---|---|---|---|---|
| 384 | 0000000000101 | 416 | 0010010011010 | 448 | 1000000000000 | 480 | 0010000111001 |
| 385 | 0000000000101 | 417 | 0010011111111 | 449 | 0111111110110 | 481 | 0001111011100 |
| 386 | 0000000000111 | 418 | 0010101101000 | 450 | 0111111100010 | 482 | 0001110000101 |
| 387 | 0000000001010 | 419 | 0010111010101 | 451 | 0111111000110 | 483 | 0001100110010 |
| 388 | 0000000001110 | 420 | 0011001000110 | 452 | 0111110011111 | 484 | 0001011100100 |
| 389 | 0000000010011 | 421 | 0011010111010 | 453 | 0111101110000 | 485 | 0001010011010 |
| 390 | 0000000011000 | 422 | 0011100110001 | 454 | 0111100111000 | 486 | 0001001010110 |
| 391 | 0000000011111 | 423 | 0011110101010 | 455 | 0111011111000 | 487 | 0001000010110 |
| 392 | 0000000101000 | 424 | 0100000100101 | 456 | 0111010101111 | 488 | 0000111011011 |
| 393 | 0000000110010 | 425 | 0100010100001 | 457 | 0111001011111 | 489 | 0000110100101 |
| 394 | 0000000111110 | 426 | 0100100011110 | 458 | 0111000001000 | 490 | 0000101110011 |

TABLE E-continued
Example Contents of Weighting Function PROM
Addresses 384-511
90 dB Dolph-Chebyshev Weighting

| | | | | | | | |
|---|---|---|---|---|---|---|---|
| 395 | 0000001001100 | 427 | 0100110011100 | 459 | 0110110101010 | 491 | 0000101000101 |
| 396 | 0000001011100 | 428 | 0101000011001 | 460 | 0110101000110 | 492 | 0000100011100 |
| 397 | 0000001101110 | 429 | 0101010010101 | 461 | 0110011011101 | 493 | 0000011110110 |
| 398 | 0000010000011 | 430 | 0101100001111 | 462 | 0110001101111 | 494 | 0000011010100 |
| 399 | 0000010011011 | 431 | 0101110001000 | 463 | 0101111111101 | 495 | 0000010110110 |
| 400 | 0000010110110 | 432 | 0101111111101 | 464 | 0101110001000 | 496 | 0000010011011 |
| 401 | 0000011010100 | 433 | 0110001101111 | 465 | 0101100001111 | 497 | 0000010000011 |
| 402 | 0000011110110 | 434 | 0110011011101 | 466 | 0101010010101 | 498 | 0000001101110 |
| 403 | 0000100011100 | 435 | 0110101000110 | 467 | 0101000010011 | 499 | 0000001011011 |
| 404 | 0000101000101 | 436 | 0110110101010 | 468 | 0100110011100 | 500 | 0000001001011 |
| 405 | 0000101110011 | 437 | 0111000001000 | 469 | 0100100011110 | 501 | 0000000111110 |
| 406 | 0000110100101 | 438 | 0111001011111 | 470 | 0100010100001 | 502 | 0000000110010 |
| 407 | 0000111011011 | 439 | 0111010101111 | 471 | 0100000101000 | 503 | 0000000101000 |
| 408 | 0001000010110 | 440 | 0111011111000 | 472 | 0011110101010 | 504 | 0000000011111 |
| 409 | 0001001010110 | 441 | 0111100111000 | 473 | 0011100110001 | 505 | 0000000011000 |
| 410 | 0001010011010 | 442 | 0111101110000 | 474 | 0011010111010 | 506 | 0000000010011 |
| 411 | 0001011110100 | 443 | 0111110011111 | 475 | 0011001000011 | 507 | 0000000001110 |
| 412 | 0001100110010 | 444 | 0111111000110 | 476 | 0010111010101 | 508 | 0000000001010 |
| 413 | 0001110000101 | 445 | 0111111100011 | 477 | 0010101101000 | 509 | 0000000000111 |
| 414 | 0001111011100 | 446 | 0111111110110 | 478 | 0010011111111 | 510 | 0000000000101 |
| 415 | 0010000111001 | 447 | 1000000000000 | 479 | 0010010011010 | 511 | 0000000000101 |

| $Log_2$ | Magnitude | Weighting Function Address |
|---|---|---|
| 0 | $0_8$–$1_8$ | $0_8$ (WTG A) |
| 1 | $2_8$–$3_8$ | $0_8$ (WTG A) |
| 2 | $4_8$–$7_8$ | $0_8$ (WTG A) |
| 3 | $10_8$–$17_8$ | $0_8$ (WTG A) |
| 4 | $20_8$–$37_8$ | $0_8$ (WTG A) |
| 5 | $40_8$–$77_8$ | $0_8$ (WTG A) |
| 6 | $100_8$–$177_8$ | $0_8$ (WTG A) |
| 7 | $200_8$–$377_8$ | $200_8$ (WTG B) |
| 8 | $400_8$–$777_8$ | $200_8$ (WTG B) |
| 9 | $1000_8$–$1777_8$ | $200_8$ (WTG B) |
| 10 | $2000_8$–$3777_8$ | $200_8$ (WTG B) |
| 11 | $4000_8$–$7777_8$ | $400_8$ (WTG C) |
| 12 | $10000_8$–$37777_8$ | $400_8$ (WTG C) |
| 13 | $20000_8$–$37777_8$ | $400_8$ (WTG C) |

An example of possible contents of the weighting function PROM 56 is shown in TABLES B through E. These TABLES show the address of the weighting function PROM (decimal numbers) and the binary contents of each address (representing the actual weighting function) as follows:

| TABLE | ADDRESS RANGE | WEIGHTING FUNCTION |
|---|---|---|
| B | 0–127 | 40 dB Dolph-Chebyshev |
| C | 128–255 | 55 dB Dolph-Chebyshev |
| D | 256–383 | 70 dB Dolph-Chebyshev |
| E | 384–511 | 90 dB Dolph-Chebyshev |

Figure 7:
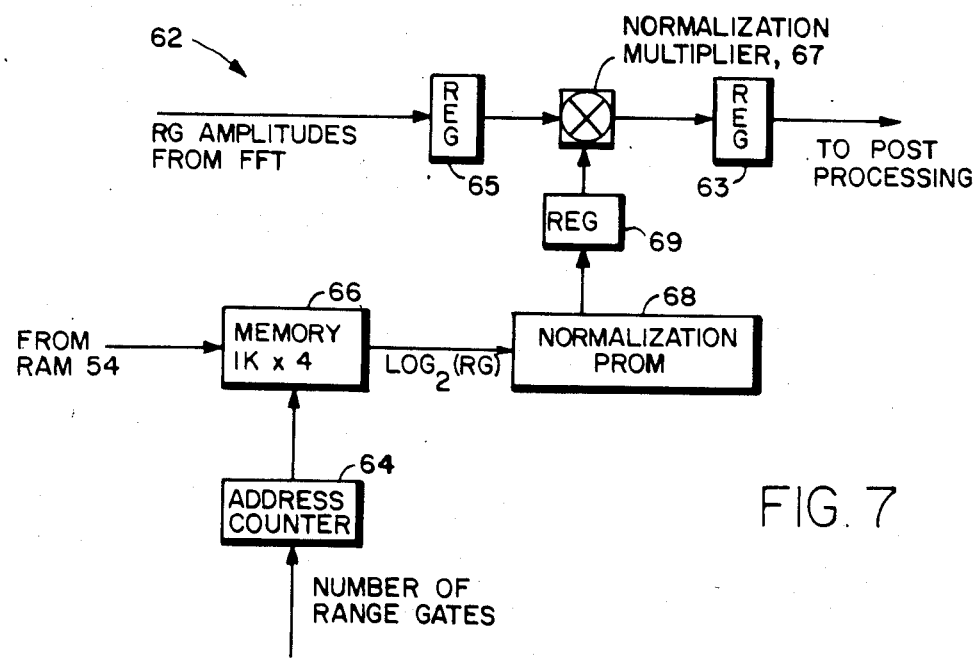
FIG. 7 is a block diagram of the range gate normalization circuit of the present invention.

The output of weighting function PROM 56 is applied to the weighting function hardware of FFT circuit 18. The FFT circuit is coupled at its output to the range gate normalization circuit 62 shown in FIG. 7. In the circuit of FIG. 7, the $Log_2$ of each range gate is used to address a normalization PROM 68 to multiply each range gate by the appropriate normalization constant. This allows the constant false alarm rate (CFAR) algorithm of post-processing block 20 to function with a uniform detection sensitivity on the FFT output. This processing is essential before any post-processing can be performed, since different range gates, in general, will have different weighting functions applied to them. The latter results in a variation of amplitudes due to the fact that weighting functions with greater sidelobe control have greater loss. For example, an FFT amplitude that receives 40 dB weighting will be greater than that same FFT amplitude when it receives 90 dB weighting. Since some of the post-processing functions require a relative comparison of range gate amplitudes, this difference must be removed, or normalized out. This is the purpose of circuit 62.

Figure 5:
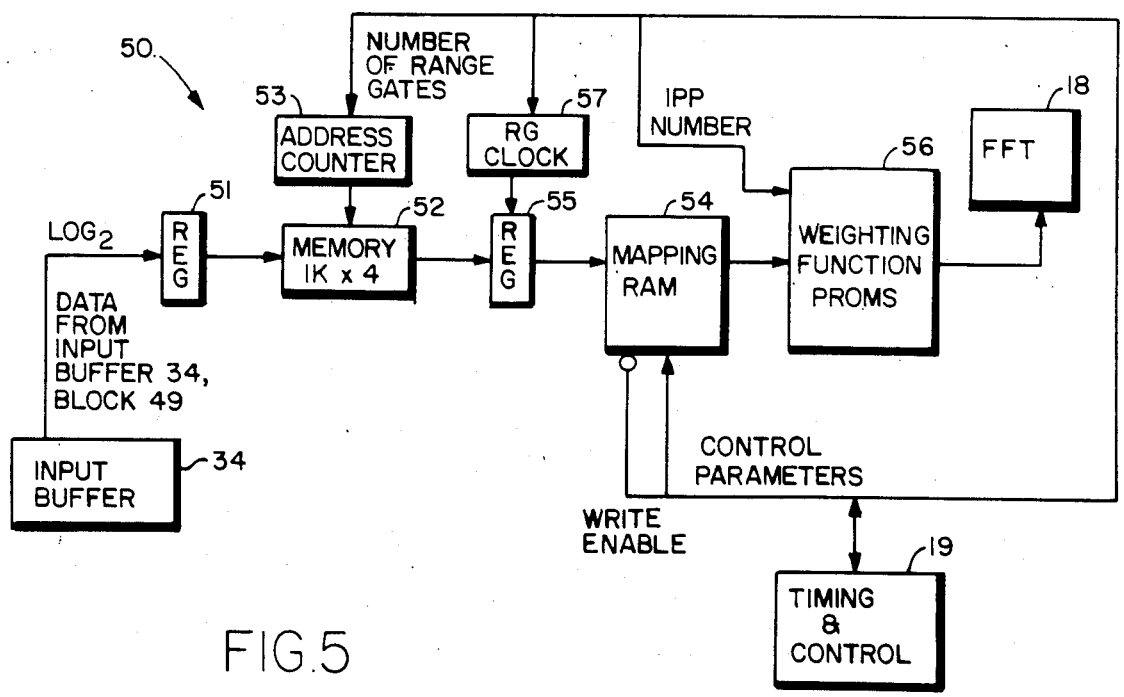
FIG. 5 is a block diagram of the weighting function select circuit of the present invention.

In the normalization circuit 62 of FIG. 7, the address counter 64 performs the same function as the address counters described for FIGS. 3 and 5. It generates a linearly increasing sequence modulo the number of range gates, and its output is coupled to the 1K×4 memory 66. The contents of the 1K×4 memory 66 are related to the $Log_2$ of the maximum range gate amplitudes. In fact, these contents are a function of those numbers. The actual contents of the 1K×4 memory 66 are the output of the mapping RAM 54 selected by the $Log_2$ of the maximum amplitude of each range gate as described for FIG. 5. Hence, as the mapping RAM 54 values are read from memory to select a particular weighting function for a range gate, they are stored in this 1K×4 memory 66 as a function of range gate.

The normalization PROM 68 contains a simple multiplier that compensates the FFT amplitudes for the particular weighting function applied. The values from the 1K×4 memory 66 (an indication of the actual weighting function applied) are coupled to and serve to address PROM 68 to select a normalization multipler for that range gate. Based on the specific example given for FIG. 6, corresponding exemplary contents of the normalization PROM 68 are shown below:

| NORMALIZATION PROM ADDRESS | CONTENTS |
|---|---|
| 0 | $342_8$ |
| 001 to 127 | 0 |
| 128 | $323_8$ |
| 129 to 255 | 0 |
| 256 | $307_8$ |
| 257 to 383 | 0 |
| 384 | $274_8$ |
| 385 to 511 | 0 |

Note that since only four weighting functions have been specified in this example, only four locations in the normalization PROM 68 are used. The addresses used correspond to the contents of the mapping RAM 54, and hence the start addresses of the four weighting functions in the weighting function PROM 56. Therefore, the four addresses that are used are (in decimal): 0, 128, 256, 384, having the contents shown above. All other addresses are at zero.

The normalization multiplier circuit 67 shown in FIG. 7 is an actual hardware multiplier that multiplies FFT amplitudes on a range gate basis (supplied via temporary storage register 65) by the normalization multiplier selected from the normalization PROM 68 (supplied via temporary storage register 69). The output of the multiplier circuit 67 is transferred to the post processing circuit 20 (via temporary storage register 63).

While the present invention has been described in connection with rather specific embodiments thereof, it will be understood that many modifications and variations will be readily apparent to those of ordinary skill in the art and that this application is intended to cover any adaptation or variation thereof. Therefore, it is manifestly intended that this invention be only limited by the claims and the equivalents thereof.

What is claimed is:

1. A radar signal processor, having an FFT circuit for processing receiver signal data, said data including a plurality of information-bearing range gates, said FFT circuit disposed for applying one of a plurality of weighting functions to a respective individual range gate, said FFT circuit thereby producing an output signal generally resulting in amplitude difference between various respective individual range gates, said radar signal processor comprising:

an input buffer for determining the magnitude of each of said range gates, wherein said input buffer makes an input buffer magnitude determination in the form of a maximum amplitude for each said range gate over a discrete period using a magnitude detector and a $Log_2$ computer computing the $Log_2$ of such detected vector magnitude for each said range gate, said input buffer including a $Log_2$ interim maximum amplitude memory and a comparator, said comparator and said $Log_2$ memory cooperating to determine a largest $Log_2$ value per range gate per discrete period, a weighting function selecting circuit connected between said input buffer and said FFT circuit, responsive to said input buffer magnitude determination, said weighting function selecting circuit selecting a weighting function to be applied to each said respective individual range gate, and a normalization circuit connected with and receiving the output signal of said FFT circuit, said normalization circuit normalizing amplitude differences in the output signal of said FFT circuit.

2. The processor of claim 1, wherein said selecting circuit comprises:

a maximum $Log_2$ memory for storing maximum $Log^2$ data from said input buffer, a weighting function memory having a set of addressable weighting functions programmed therein, and a mapping memory for selecting a particular weighting function as a function of range gate amplitude, said mapping memory being addressed with maximum $Log_2$ data from said maximum $Log_2$ memory for each said range gate, and said weighting function memory being addressed with the output of said addressed mapping memory as a function of range gate amplitude for selection of one of said set of addressable weighting functions programmed therein.

3. The processor of claim 2, wherein said processor is operable under the control of a control computer, and said mapping memory is a random access memory and receives control parameters from said control computer.

4. The processor of claim 3, further comprising:

a timing and control circuit, said timing and control circuit supplying write enable signals to said input buffer and to said selecting circuit, and supplying range gate counts to said input buffer, to said selecting circuit and to said normalization circuit, and supplying range gate clocking data and interpulse period data to said selecting circuit, and said weighting function memory being addressed with both the output of said mapping memory and also said interpulse period data.

5. The processor of claim 2, wherein said normalization circuit comprises:

a post-mapping memory for storage of the contents of said mapping memory based upon the $Log_2$ of the maximum amplitude of each said range gate, a normalization memory containing compensating normalization multiplier values correlated with said weighting functions of said weighting function memory, a respective one of said values being selected by addressing said normalization memory with a respective $Log_2$ value of a respective range gate from said post-mapping memory, a multiplier circuit, said FFT circuit delivering range gate amplitude data to said multiplier circuit and said multiplier circuit multiplying said range gate amplitude data by a respective selected one of said normalization multiplier values.

6. The processor of claim 5, further comprising at least one address counter, said counter generating a linearly increasing sequence modulo the number of range gates in said discrete period.

7. The processor of claim 4, wherein said normalization circuit comprises:

a post-mapping memory for storage of the contents of said mapping memory based upon the $Log_2$ of the maximum amplitude of each said range gate, a normalization memory containing compensating normalization multiplier values correlated with said weighting functions of said weighting function memory, a respective one of said values being selected by addressing said normalization memory with a respective $Log_2$ value of a respective range gate from said post-mapping memory, a multiplier circuit, said FFT circuit delivering range gate amplitude data to said multiplier circuit and said multiplier circuit multiplying said range gate amplitude data by a respective selected one of said normalization multiplier values.

8. The processor of claim 7, further comprising at least one address counter, said counter generating a linearly increasing sequence modulo the number of range gates in said discrete period.

9. A radar signal processor for processing receiver signal data, said data including a plurality of information-bearing range gates, comprising:

an input buffer for determining the magnitude of each of said range gates, wherein said input buffer makes an input buffer magnitude determination in the form of a maximum amplitude for each said range gate over a discrete period and includes a magnitude detector and a $Log_2$ computer, said detector detecting a vector magnitude of each said range gate, and said $Log_2$ computer computing the $Log_2$ of such detected vector magnitude for each said range gate, said input buffer including a $Log_2$ interim maximum amplitude memory and a comparator, said comparator and said $Log_2$ interim maximum amplitude memory cooperating to determine the largest $Log_2$ value per range gate per discrete period, a weighting function selecting circuit connected to said input buffer, said weighting function selecting circuit, responsive to said input buffer magnitude determination, said weighting function selecting circuit selecting a weighting function to be applied to each said respective individual range gate, an FFT circuit connected between said input buffer and said weighting function selecting circuit and being responsive to said input buffer magnitude determination and selecting a weighting function to be applied to each respective individual range gate, said FFT circuit producing an output signal by applying a respective selected weighting function to a respective individual range gate, said applying resulting in amplitude differences between various respective individual range gates, and a normalization circuit connected with and receiving the output signal of said FFT circuit, said normalization circuit normalizing said amplitude differences in the output signal of said FFT circuit.

10. The processor of claim 9, wherein said selecting circuit comprises:

a maximum $Log_2$ memory for storing maximum $Log_2$ data from said input buffer, a weighting function memory having a set of addressable weighting functions programmed therein, and a mapping memory for selecting a particular weighting function as a function of range gate amplitude, said mapping memory being addressed with maximum $Log_2$ data from said maximum $Log_2$ memory for each said range gate, and said weighting function memory being addressed with the output of said addressed mapping memory as a function of range gate amplitude for selection of one of said set of addressable weighting functions programmed therein.

11. The processor of claim 10, wherein said processor is operable under the control of a control computer, and said mapping memory is a random access memory and receives control parameters from said control computer.

12. The processor of claim 11, further comprising:

a timing and control circuit, said timing and control circuit supplying write enable signals to said input buffer and to said selecting circuit, and supplying range gate counts to said input buffer, to said selecting circuit and to said normalization circuit, and supplying range gate clocking data and interpulse period data to said selecting circuit, and said weighting function memory being addressed with both the output of said mapping memory and also said interpulse period data.

13. The processor of claim 12, wherein said normalization circuit comprises:

a post-mapping memory for storage of the contents of said mapping memory based upon the $Log_2$ of the maximum amplitude of each said range gate, a normalization memory containing compensating normalization multiplier values correlated with said weighting functions of said weighting function memory, a respective one of said values being selected by addressing said normalization memory with a respective $Log_2$ value of a respective range gate from said post-mapping memory, a multiplier circuit, said FFT circuit delivering range gate amplitude data to said multiplier circuit and said multiplier circuit multiplying said range gate amplitude data by a respective selected one of said normalization multiplier values.

14. The processor of claim 13, further comprising at least one address counter, said counter generating a linearly increasing sequence modulo the number of range gates in said discrete period.

* * * * *